Nov. 22, 1949     A. A. WOLF     2,488,574
ERROR RECORDER
Filed Oct. 10, 1947
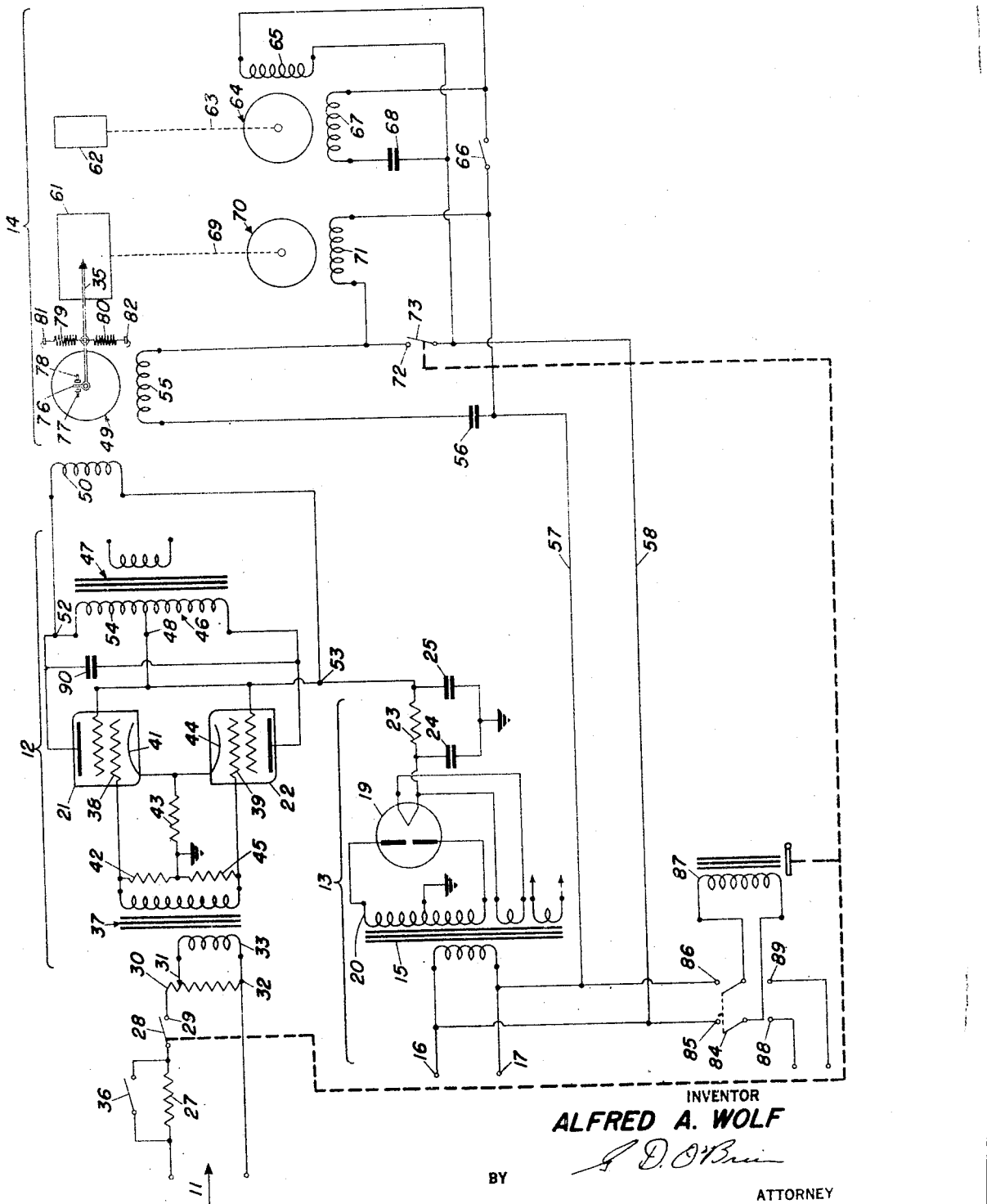
INVENTOR
ALFRED A. WOLF
BY
ATTORNEY Patented Nov. 22, 1949

2,488,574

UNITED STATES PATENT OFFICE 2,488,574

ERROR RECORDER

Alfred A. Wolf, Dallastown, Pa.

Application October 10, 1947, Serial No. 779,087

3 Claims. (Cl. 346—33)

(Granted under the act of March 3, 1883, as amended April 30, 1928; 370 O. G. 757)

The present invention relates to recording meters and more specifically to electrical error recorders of the type employed in testing the performance of gun mount power drives and in determining the fidelity of any given drive in following order signals from a director.

In naval fire control systems a line of sight on a selected target is established and maintained by a controlling unit known as a "director." The gun is driven in elevation and in train by power drives and thereby positioned and maintained on a proper line of fire. Included in the director are signal generators for transmitting electrical order signals to which the power drives respond in positioning the gun. A director signal generator and a power drive comprise a continuous remote control system. Such a system is disclosed in my co-pending patent application Serial No. 626,414, filed in the United States Patent Office on Nov. 2, 1945, and entitled "Continuous control system." Included in each power drive is an instrument, such as a synchro control transformer, for detecting the difference between order and response and for producing an electrical error signal having a magnitude functionally related to that difference. The performance of a power drive is studied by plotting the instantaneous magnitudes of the error signals against time, while the gun mount is accelerated, decelerated, driven at constant velocity or with an oscillatory or simple harmonic motion, as desired. During such tests the power drive is actuated by a dummy director, which simulates the performance of a standard director aboard ship and generates electrical order signals which cause the gun mount to move in the desired fashion. Such a dummy director is disclosed in my co-pending patent application, Serial No. 631,451, filed in the United States Patent Office on Nov. 28, 1945, and entitled "Motion generator." While the dummy director generates electrical orders and the power drive produces a mechanical response, an error recorder measures the instantaneous magnitudes of the error signals and plots them as ordinates on a linear time base. While the present invention has a wide range of prospective application, it is of particular utility as an error recorder.

One prior-art error recorder is based on the synchro differential motor. The position of the rotor of such a motor indicates the difference between electrical signals applied to the rotor and stator and representative of order and response, respectively. On the shaft of the differential motor is an arm which carries an electrode. A vibrator-type spark coil is connected between this electrode and a metallic drum driven by a constant-speed power motor. During a test a slip of paper is held against the drum and is driven past the movable electrode at constant speed. When the spark coil is energized, sparks pass between the electrode and the metallic drum and puncture the paper. If the two electrical signals representative of order and response remain identical throughout the test, as would occur with a perfect power drive, the punctures thus obtained form a straight line which corresponds approximately to the center line of the paper. When the signals differ, the position of the movable electrode changes and the dots are displaced toward one edge of the paper or the other. The arc through which the movable electrode is displaced is substantially proportional to the error signal or difference between the order and response signals. Since the curvature of this arc is slight within the range of travel of the electrode the magnitude of the error signal is assumed to be proportional to the perpendicular distance between the point of the movable electrode and the zero error line. The zero error line is indicated throughout the test by sparks passing between a stationary electrode and the drum. A second spark coil is employed to produce discharges across the stationary gap. The perpendicular distance from the puncture to the zero error line represents the magnitude of the error. Since the paper is driven by a constant-speed motor to provide a linear time base, the other coordinate represents time. Consequently the graph which is produced by the punctures is an error-time curve. This prior-art arrangement is subject to several limitations: (1) the inertia of the differential motor is relatively so high that rapidly changing or "high frequency" errors are not recorded with accuracy; (2) a mechanical damping arrangement built into the differential motor to prevent undesired spinning produces variations in the error record which are not present in the received signal; (3) the differential motor permits only one scale setting to be established—an undesirable limitation when studying minute errors or very large errors.

Another prior-art error recording arrangement is premised on the use of the oscillograph. The limitation of this arrangement resides in the fact that it displays the whole alternating current error signal but not in phase-significant fashion: i. e., the error is so displayed that its magnitude is indicated but its direction is not, so that the operator cannot readily determine whether the power drive response is lagging or leading the order signals from the dummy director.

It is therefore desirable to provide a recording instrument which accurately indicates the magnitude of a rapidly varying electrical quantity as well as its directional characteristic of the quantity.

It is an object of the present invention to provide an improved recording meter which avoids the limitations and disadvantages attendant upon the use of the above-mentioned prior-art arrangements and which at the same time possesses the desirable characteristics just enumerated.

It is a further object of the invention to provide an improved arrangement for preventing damage to the recording pen when excessively large signals are applied to the meter.

For a better understanding of the present invention, together with other and further objects and advantages thereof, reference is made to the following specification, to the claims appended thereto and to the accompanying drawing, of which the sole figure is a schematic diagram of an error recorder embodying the present invention in a preferred form, the electrical circuits being shown in detail and conventional mechanical components being indicated in symbolic form.

Referring now to the drawing, there are illustrated a signal input circuit 11, adapted to have applied thereto the electrical error signals, an amplifier 12 for amplifying the error signals, a power supply 13 for furnishing suitable potentials to the amplifier, and the recording mechanism proper as indicated at 14.

The power supply is conventional and it consists of the following components: a transformer 15 having input terminals 16 and 17 adapted to be coupled to a 115 volt, 60 cycle, alternating current source; a full wave rectifying tube 19 (5T4) having its anodes, individually connected to the terminals of a high potential transformer secondary and its filaments coupled to another secondary winding which functions as a heating current source; still another secondary winding 20 which furnishes filament current to tubes 21 and 22; a filter comprising a series resistor 23 (1000 ohms, 10 watts), and two shunt condensers 24 and 25 (each 2–20 microfarads). The center cap of the high voltage secondary winding is grounded and constitutes the negative terminal of the rectifier tube output. The positive output lead of tube 19 proceeds from its cathode to the junction of elements 23, 24. The junction of elements 24, 25 is grounded.

The signal input circuit comprises a series resistor 27 (50,000 ohms), a pair of relay contacts 28, 29 and a potentiometer 30 (10,000 ohms). A tap 31 on the potentiometer and potentiometer terminal 32 are individually connected to the amplifier input transformer primary 33. Tap 31 may be adjusted to vary the deflection of the recording pen 35 for any given input signal. A single pole single throw switch 36, in shunt with resistor 27, permits a choice of two deflection settings for any given position of sliding tap 31.

The secondary winding of the amplifier input transformer is so arranged that the input error signal is applied with opposite polarity to the control electrodes of the tubes 21 and 22. To this end, the secondary terminals are individually connected to control electrodes 38 and 39. In circuit between control electrode 38 and cathode 41 of tube 21 is a series combination of a grid resistor 42 (100,000 ohms) and a cathode biasing resistor 43 (200 ohms). Similarly, there is placed in circuit between grid 39 and cathode 44 of tube 22 a series combination of a resistor 45 (100,000 ohms) and cathode biasing resistor 43. The terminal of resistor 43 remote from cathodes 41 and 44 is grounded. The anodes of the tube are connected to the terminals of a primary winding 46 of a transformer 47. The secondary of this transformer is not used. The screen grids of the tubes and the center cap 48 of the output transformer are connected together and then to the positive terminal of the filtered power supply.

The function of the amplifier 12 is to supply an amplified voltage which controls motor 49. In order to match the output circuits of the tubes to the motor, the control field winding 50 of the motor is connected to terminals 52 and 53 and thus effectively to portion 54 of primary winding 46.

The motor 49 includes a reference voltage winding 55, coupled through a phase splitting condenser 56 (1 microfarad, 220 volts) to line terminals 16 and 17 by conductors 57 and 58. Neglecting for the moment the operation of motor 49, other than to say that its function is to position pen 35, the description is not directed to the general features of the recording mechanism indicated at 14. In accordance with the prior-art there is provided a roller (not shown) upon which a roll of recording paper is placed. The paper is passed over a conventional recording drum 61 and tension is exerted on the paper by a conventional paper winding drum 62. As the recording drum is turned, paper is taken out from the roller, passed over the drum and taken up by the paper winder. The paper winder is rotated, through a system of four-to-one gearing indicated generally at 63, by a torque motor 64. This torque motor is of the two-phase type and has a winding 65 coupled to terminals 16 and 17 through a single pole single throw switch 66 and a winding 67 coupled to the same terminals through a phase splitting capacitor 68 (1 microfarad, 220 volts). The sole function of elements 62 to 68, inclusive, is to exert tension on or take up the slack in the recording paper. The function of the recording drum 61 is to furnish a linear time base. To that end, the drum is driven through a system of reduction gearing and shafting indicated at 69 (504:1) by a constant speed synchronous motor 70. This motor is arranged for shaded-pole starting and it has a field winding 71, coupled through a pair of relay contacts 72, 73 to line terminals 16, 17. Suitable operating conditions and dimensions are: Speed of motor 70, 3600 R. P. M.; speed of drum 61, 7.14 R. P. M.; peripheral speed of paper, 20 mm. per sec.; diameter of drum 61, 2.1 inches. The sole function of drum 61 and elements 69 to 73, inclusive, is to provide a linear time base for the recording operation.

The function of motor 49 is to move the recording pen or stylus 35. This motor is of the induction type. Preferably a Kohlsman type 945-B-05 alternating current generator or tachometer is employed as motor 49. This type of motor is generally known as a "drag-cup generator." It has no brushes or slip rings. One of its windings 55 is excited as hereinabove indicated from the source and is coupled to input terminals 16 and 17. The other winding is excited from the circuit including terminals 52, 53. The motor comprises an aluminum cup-shaped rotor, which rotates in the air gap between its laminated steel stator and core. Secured to the rotor is an arm 76, suitably arranged with respect to limit stops 77 and 78 to permit a limited rotation of the motor rotor. The rotor is also secured to stylus 35 and moves it to one side or the other against the bias of positioning springs 79 and 80. The latter are secured to supports 81 and 82 in such a manner as normally to maintain the stylus on the zero base line of the recording paper. The motor rotor turns in one direction or the other in accordance with the relative phases of the current in windings 50 and 55. It turns in one direction when the current in winding 55 leads that in winding 50 and in the other direction when the converse is the case.

Coming now to a description of the operation of the above-described recording meter, it will be understood that an input signal, the variations of which with time are to be measured, is applied to the input circuit 11 and amplified by amplifier 12. Constant speed motor 70 causes the recording paper to turn around the drum at a predetermined speed and the slack in the paper is taken up by paper winder 62. As the error signal increases, stylus 35 moves further outward from and to one side of the zero base line of the recording paper and as the error signal reverses in polarity stylus 35 moves to the other side of the base line. Thus the recording drum and stylus so operate as to furnish a continuous graph of error signal magnitude and polarity versus time.

When switch 84 is closed on contacts 85, 86, winding 87 of a relay is excited and it closes contacts 28, 29 and 72, 73, thus permitting the input signal to be applied to the amplifier and starting the recorder drum motor 70. When several varying quantities are to be measured against the synchronized time bases, a plurality of error recorders may be employed. In such case switch 84 is closed on contacts 88, 89 to energize winding 87 of the relay and to initiate operation of the error recorder shown. The other error recorders (not shown) have similar relays and contacts corresponding to 88, 89 and connected in parallel therewith.

The function of condenser 90 (0.25 microfarad) is to resonate the impedance load of motor 49 and transformer 47 and thus to increase the amplification of the input signal.

When an excessively large signal is applied to the meter, the pen 35 is protected in the following manner: (1) by the setting of limit stops 77 and 78; (2) by amplifier "saturation" in unit 12. Let it be assumed that such signal tends to make grid 38 more positive and grid 39 more negative. The conductivity of tube 21 is determined by the bias caused by cathode-current flow in resistor 43, the signal input across resistor 42 and the bias caused by grid-current flow in resistor 42. The last-mentioned resistor is in series with the secondary of transformer 37 and the flow of grid current therein produces a bias which opposes the signal input. The amplifier output characteristic has a non-linear portion, then, so that an excessively strong input signal drives its output signal to the "saturation" point. The operation of tube 22 is apparent from the foregoing description. The limit stops are so adjusted as to become effective at or near the "saturation" point as desired. Thus I provide a recording arrangement which is sensitive to low input signals. At the same time, the pen is not damaged when excessively high voltages are applied to the input, even if the amplifier is adjusted for high gain. Tubes 21 and 22 function as grid-current limiters.

While there has been shown what is at present considered to be the preferred embodiment of the present invention, it will be obvious to those skilled in the art that various changes and modifications may be made therein without departing from the true scope of the invention and it is, accordingly, intended in the appended claims to cover all such changes and modifications as fall within the true scope of the invention and without that of the prior-art.

The invention herein described may be manufactured and used by or for the Government of the United States of America for governmental purposes without the payment of any royalties thereon or therefor.

I claim:

1. In a recording meter of the type comprising means for producing a zero-axis linear time base, circuit means for receiving electrical signals having a phase and magnitude respectively variable in accordance with the direction and magnitude of the condition to be recorded, means including a pen for making a time graph of said electrical signal, biasing means for centering said pen on said zero axis, an induction motor connected to said circuit whereby the direction of rotation thereof is dependent upon the phase relation of said field current, and means connecting the rotor of said motor to said pen, said biasing means being yieldable to absorb the torque of said motor necessary to move said pen laterally of said zero axis in direction dependent upon the direction of rotation of said motor and by an amount dependent upon the magnitude of said signal.

2. In a recording meter the combination comprising circuit means including input terminals for receiving electrical signals having a phase and magnitude respectively variable in accordance with the direction and magnitude of the condition to be recorded, an induction motor for driving a recording pen having an output torque variable in magnitude and direction in accordance with the phase and magnitude of the electrical signal applied thereto, said circuit means including a non-linear amplifier having high gain for signals of low magnitude, and low gain for signals of high magnitude connecting said motor to said input terminals whereby to limit the output torque thereof, and mechanical stop means for limiting the angular motion of said motor.

3. The combination defined in claim 2 wherein said circuit means comprises a transformer having primary and secondary windings, means connecting said primary to said input terminals, a pair of electron tubes each having a cathode, anode and control electrode, means inter-connecting the cathodes of each tube and connecting the control electrode of each tube to a respective terminal of said secondary for push pull amplification, said connecting means also comprising a T resistance network connecting the inter-connected cathodes of each tube to its respective control electrode whereby to limit the amplification when high voltages are applied to said primary.

ALFRED A. WOLF.

REFERENCES CITED

The following references are of record in the file of this patent:

UNITED STATES PATENTS

| Number | Name | Date |
| --- | --- | --- |
| 130,971 | Batchelder | Sept. 3, 1872 |
| 882,586 | Robinson | Mar. 24, 1908 |
| 2,178,641 | Neumann | Nov. 7, 1939 |
| 2,264,181 | May | Nov. 25, 1941 |
| 2,334,991 | Castiglia | Nov. 23, 1943 |